United States Patent [19]

Wang et al.

[11] 4,206,063

[45] Jun. 3, 1980

[54] DEWATERING AID COMPOSITION

[75] Inventors: Samuel S. Wang, Chesire; Morris E. Lewellyn, Stamford, both of Conn.; Charles Dugan, Bronx, N.Y.

[73] Assignee: American Cyanamid Company, Stamford, Conn.

[21] Appl. No.: 966,677

[22] Filed: Dec. 5, 1978

[51] Int. Cl.$^2$ ............................................... C09K 3/00
[52] U.S. Cl. ...................................... 252/60; 252/61; 252/194; 210/44; 209/166
[58] Field of Search ........................... 252/60, 61, 194; 209/166; 210/44

[56] References Cited

U.S. PATENT DOCUMENTS 4,097,390  6/1978  Wang et al. .............................. 252/60

*Primary Examiner*—Mayer Weinblatt
*Attorney, Agent, or Firm*—William J. van Loo; Frank M. Van Riet

[57] ABSTRACT

The mixture of a hydrophobic alcohol and a nonionic surfactant is an effective dewatering aid for mineral concentrates, significantly lowering the moisture content.

7 Claims, No Drawings

DEWATERING AID COMPOSITION

BACKGROUND

This invention relates to a composition of matter useful as a dewatering aid in the processing of various mineral concentrates and coal. More particularly, this invention relates to such a composition comprising, in combination, a hydrophobic alcohol and a nonionic surfactant.

Valuable components of numerous minerals are concentrated by a variety of procedures that provide mineral concentrates that can then be further processed. One of the most widely used methods of concentration is froth flotation which is applicable to a wide variety of minerals including coal. After a mineral has been sufficiently enriched in valuable component by concentrating, it is usually subjected to dewatering so that it may be shipped more economically and/or further processed more readily. In dewatering, the mineral concentrate, in slurry form, is subjected to sedimentation, decantation, filtration or variations thereof to facilitate the removal of water therefrom. This removal of water decreases the weight of the concentrate and, in the case of coal, increases the BTU value per unit weight of concentrate; the removal of water by dewatering also reduces the energy requirements for subsequent evaporation of residual water when necessary, such as for smelting.

Sedimentation, in which the settling of suspended matter from the slurry is accomplished, is generally such an extremely slow process that it is generally the commercial practice to add a flocculating agent, such as glues, acids, starches, natural gums and the like, to cause the individual mineral particles to flocculate by interaction with the flocculating agent. Flocculation thus reduces the necessary holding time in settling basins or vessels before decantation of the supernatant liquor can be initiated.

Removal of the water from the resulting concentrated slurry is generally achieved through some form of filtration. The filter cake which forms during filtration is often substantially impermeable and filtration can be effected therethrough only at extremely slow rates and/or under extremely high pressures. Even when such an impermeable filter cake is not formed, it is advantageous to be able to accelerate the filtration speeds through the application of a dewatering aid which, when added in effective amounts to the concentrate slurry, reduces the residual water content thereof below that obtained in the absence of the additive, improves filter cake handling qualities and reduces binding of the filter medium. Surface active agents have long been known to be effective aids in the dewatering of mineral concentrates. Various flocculants have also been known to improve the filtration process. It was later found that the use of both a surface active agent and a flocculant led to advantages over either of the separate components alone at an equal total dosage.

In spite of the effectiveness of dewatering aids or combinations thereof, there nevertheless still exists the need for improved dewatering aids which provide lower residual water in the filtered concentrate and result in advantages thereby. Considering annual processing of many millions of tons of mineral ores and coal, such advantages could provide substantial savings in shipping costs and significant increases in available BTU values. The provision for improved dewatering aids, therefore, would fulfill a long-felt need and constitute a significant advance in the art.

SUMMARY OF THE INVENTION

The dewatering aid components of the present invention act synergistically in combination when utilized to lower the residual water contents of filter cakes. In addition to this unexpectedly improved performance with respect to the residual water content, the dewatering aid composition of the present invention results in a high retention of the mineral particles on the filter cake, low foaming of the filtrate and is not adversely affected by high alkaline environments.

DESCRIPTION OF THE INVENTION INCLUDING PREFERRED EMBODIMENTS

In accordance with the present invention there is provided a dewatering aid for mineral and coal concentrates which comprises, in combination, a hydrophobic alcohol, said hydrophobic alcohol containing a linear or branched aliphatic radical of eight to eighteen carbon atoms, inclusive, and a nonionic surfactant of the general structure:

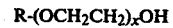

$$R\text{-}(OCH_2CH_2)_x OH$$

wherein x is an integer of 1 to 15, inclusive, R is a linear or branched alkphatic radical having 6 to 24 carbon atoms, inclusive, in the alkyl moiety.

Suitable hydrophobic alcohols for use in the present invention include octanol, methyl ethyl pentanol, trimethyl pentanol, ethyl hexanol, methyl heptanol, nonanol, methyl octanol, ethyl heptanol, methyl ethyl hexanol, dimethyl heptanol, decanol, methyl nonanol, ethyl octanol, trimethyl heptanol, undecanol, methyl decanol, ethyl nonanol, dodecanol, tetradecanol, hexadecanol, octadecanol, and the like.

Suitable nonionic surfactants for use in the present invention are ethoxylated long chain alcohols of 6 to 24 carbon atoms. Typically these nonionic surfactants are the result of reacting these alcohols with ethylene oxide under conventional conditions. In addition, nonionic surfactants are commercially available under the trade names of Tergitol ® and Neodol ®, manufactured by Union Carbide and Shell Chemicals, respectively.

The composition of the hydrophobic alcohol and the nonionic surfactant will comprise from about 1 to 99 weight percent of the hydrophobic alcohol and, correspondingly, from about 99 to 1 weight percent of the nonionic surfactant, based on the total weight of the hydrophobic alochol and the nonionic surfactant. The optimum composition for use will vary widely depending upon the specific hydrophobic liquid and nonionic surfactant employed. In a preferred embodiment, the weight percent of the hydrophobic alochol will be from 50 to 90 weight percent and, correspondingly, the weight percent of the nonionic surfactant will be from about 50 to 10 weight percent, same basis. It is likewise preferred to employ as the alcohol part of the dewatering aid, a hydrophobic alcohol containing a branched or linear aliphatic radical of 8 to 12 carbon atoms, inclusive.

The composition of the present invention, when used for dewatering mineral concentrates, is preferably used in conjunction with a flocculant. In carrying out such processing, use is made of any mineral concentrate that is conventionally subjected to dewatering. Particularly effective are those mineral concentrates that are obtained in the form of aqueous slurries of finely ground ores. Concentrates of copper and iron as the sulfides and oxides, salt minerals, coal refuse, fine coal, and the like, are preferred for processing using the dewatering aid of the present invention.

The process of dewatering for which the combination dewatering aid is provided is such that water is removed in liquid form from a slurry of mineral concentrate in water. Thus, the term "dewatering", as that term is used herein, means that water is removed per se, that is in liquid form as opposed to vapor or solid form.

In carrying out processing using the dewatering aid of the present invention, an aqueous slurry of mineral concentrate is treated with an effective amount of the dewatering aid. The effective amount of the dewatering aid will generally vary depending upon factors such as the specific mineral being processed, the specific hydrophobic alcohol employed, the specific nonionic surfactant employed, and the like. Generally, from 0.1 pounds per ton to 5.0 pounds per ton should be employed to achieve satisfactory results, preferably 0.5 to 2.0 pounds per ton.

An effective amount of a cationic flocculant is generally added to the dewatering process in accordance with conventional procedures. Preferred flocculants include polydiallyldiamines, polyacrylamides, and the like. Additionally, water-soluble alcohols such as methyl, ethyl and isopropyl alcohol may be employed as co-solvents and/or fuel oil or mineral oil may be employed to control foaming.

After the dewatering aid and other reagents have been mixed with the aqueous slurry of mineral concentrate, the slurry is dewatered following conventional procedures to remove the liquid water. In the examples which follow, dewatering was effected using a pressure filter. Alternative procedures include air filtration, centrifugation, vacuum filtration, and the like.

Whereas the exact scope of the present invention is set out in the appended claims, the following specific examples illustrate certain aspects of the present invention. Although processing is illustrated using iron ore, it is to be understood that similar advantages result using other mineral concentrates. In carrying out the dewatering examples, an experimental procedure, as described below was employed. This procedure is found to correlate well with commercial procedures. All parts and percentages are by weight unless otherwise specified.

EXPERIMENTAL PROCEDURE

Iron ore slurry containing 62% solids was made homogeneous through stirring whereupon representative test samples of 96.6 parts each were taken by weighing the slurry into 250 ml beakers. The pH of the test samples was adjusted to a pH of 10.5, which is generally the normal operating pH in a processing plant. The slurry was then treated with reagents by pipette, using a 1% aqueous solution of the dewatering aid to be employed and a 0.1% aqueous solution of a flocculant, in this case, polydiallyldiamine. In each instance, the dewatering aid was added first while stirring, followed by 0.025 pounds per ton of the flocculant after approximately one (1) minute had elapsed. After an additional minute of conditioning, the slurry was poured into a Krueger Pressure Filter (Model A-500, 1 liter capacity) using a 9 cm Whatman No. 1 filter paper. The pressure was opened to 10 psi for a period of 100 seconds. The pressure was then released and the wet filter cake weighed. The filter cake was next dried overnight at 150° F. and the dry weight obtained. The percent moisture was calculated as follows:

$$\% \text{ Moisture} = \frac{\text{Wet Weight} - \text{Dry Weight}}{\text{Wet Weight}} \times 100$$

COMPARATIVE EXAMPLE A

The Experimental Procedure set forth above is followed in every material detail except that a dewatering aid was not employed. Test results are given in Table I below.

TABLE I

| CONTROL DEWATERING RUNS | |
|---|---|
| Run | Percent Moisture |
| 1 | 19.1 |
| 2 | 18.7 |
| 3 | 18.7 |
| 4 | 18.8 |

EXAMPLE 1

The Experimental Procedure set forth above is followed in every material detail. The dewatering aid employed comprises: 27.4% decyl alcohol (95 weight percent trimethyl-1-heptanol, 5 weight percent primary alcohols), 11.1% polyethylene glycol ether of a linear glycol with a hydrophilic-lipophilic balance of 12.1, 10% 2B alcohol (ethanol with 0.5% benzene added), 30% methyl cellosolve, and 21.5% water. Test results are given in Table II.

TABLE II

| DEWATERING RUNS OF EXAMPLE 1 | | |
|---|---|---|
| Run | Dosage (Lb/Ton Solids) | Percent Moisture |
| 1 | 0.5 | 15.7 |
| 2 | 0.5 | 14.0 |
| 3 | 0.5 | 16.6 |
| 4 | 0.5 | 16.4 |
| 5 | 0.75 | 14.8 |
| 6 | 0.75 | 14.5 |
| 7 | 0.75 | 13.6 |
| 8 | 0.75 | 14.4 |
| 9 | 1.0 | 13.3 |
| 10 | 1.0 | 13.3 |
| 11 | 1.0 | 13.4 |
| 12 | 1.0 | 13.7 |

EXAMPLE 2

The Experimental Procedure set forth above is followed in every material detail. The dewatering aid employed comprises: 27.5% decyl alcohol, 15% polyethylene glycol ether of a linear glycol with a hydrophilic-lipophilic balance of 10.5, 10% 2B alcohol (ethanol with 0.5% benzene added), 30% methyl cellosolve, and 17.5% water. Test results are given in Table III.

TABLE III

| DEWATERING RUNS OF EXAMPLE 2 | | |
|---|---|---|
| Run | Dosage (Lb/Ton Solids) | Percent Moisture |
| 1 | 0.5 | 15.4 |
| 2 | 0.75 | 14.9 |
| 3 | 1.0 | 14.4 |

EXAMPLE 3

The Experimental Procedure set forth above is followed in every material detail. The dewatering aid employed comprises: 30% decyl alcohol, 20% polyethylene glycol ether of a linear alcohol with a hydrophilic-lipophilic balance of 14.2, 15% methyl cellosolve, and 35% water. Test results are given in Table IV.

TABLE IV
DEWATERING RUNS OF EXAMPLE 3

| Run | Dosage (Lb/Ton Solids) | Percent Moisture |
|---|---|---|
| 1 | 0.5 | 16.0 |
| 2 | 0.75 | 13.4 |
| 3 | 1.0 | 13.6 |

EXAMPLE 4

The Experimental Procedure set forth above is followed in every material detail. The dewatering aid employed comprises: 27.4% decyl alcohol, 11.1% $C_{12}-C_{13}$ linear primary alcohol ethoxylate with a hydrophilic-lipophilic balance of 12.0, 10% 2B alcohol (ethanol with 0.5% benzene added), 30% methyl cellosolve, 21.5% water. Test results are given in Table V.

TABLE V
DEWATERING RUNS OF EXAMPLE 4

| Run | Dosage (Lb/Ton solids) | Percent Moisture |
|---|---|---|
| 1 | 0.5 | 14.0 |
| 2 | 0.75 | 12.6 |
| 3 | 1.0 | 13.1 |

EXAMPLE 5

The Experimental Procedure set forth above is followed in every material detail. The dewatering aid employed comprises: 27.4% decyl alcohol, 11.1% polyethylene glycol ether of linear alcohol with a hydrophilic-lipophilic balance of 12.4, 10% 2B alcohol (ethanol with 0.5% benzene added), 30% methyl cellosolve, 21.5% water. Test results are given in Table VI.

TABLE VI
DEWATERING RUNS OF EXAMPLE 5

| Run | Dosage (Lb/Ton Solids) | Percent Moisture |
|---|---|---|
| 1 | 0.5 | 16.2 |
| 2 | 0.75 | 14.0 |
| 3 | 1.0 | 13.8 |

COMPARATIVE EXAMPLE B

The Experimental Procedure set forth above is followed in every material detail. The dewatering aid employed comprises: 40% sodium Di(2-ethylhexyl) sulfosuccinate, 10% 2-ethylhexanol, 50% water. Test results are given in Table VII.

TABLE VII
DEWATERING RUNS OF COMPARATIVE EXAMPLE B

| Run | Dosage (Lb/Ton Solids) | Percent Moisture |
|---|---|---|
| 1 | 0.79 | 15.9 |
| 2 | 1.05 | 16.0 |
| 3 | 1.32 | 16.7 |
| 4 | 1.58 | 17.0 |

COMPARATIVE EXAMPLE C

The Experimental Procedure set forth above is followed in every material detail. The dewatering aid employed comprises: 27.5% decyl alcohol, 12.5% sodium dioctyl sulfosuccinate, 10% 2B alcohol (ethanol with 0.5% benzene added), 30% methyl cellosolve, 20% water. Test results are given in Table VIII.

TABLE VIII
DEWATERING RUNS OF COMPARATIVE EXAMPLE C

| Run | Dosage (Lb/Ton Solids) | Percent Moisture |
|---|---|---|
| 1 | 0.5 | 16.5 |
| 2 | 0.75 | 15.2 |
| 3 | 1.0 | 15.3 |

COMPARATIVE EXAMPLE D

The Experimental Procedure set forth above is followed in every material detail. The dewatering aid employed comprises: 30% decyl alcohol, 25% $C_{12}-C_{15}$ linear primary alcohol ethoxysulfate sodium salt, 20% methyl cellosolve, 25% water. Test results are given in Table IX.

TABLE IX
DEWATERING RUNS OF COMPARATIVE EXAMPLE D

| Run | Dosage (Lb/Ton Solids) | Percent Moisture |
|---|---|---|
| 1 | 0.5 | 14.3 |
| 2 | 0.5 | 15.5 |
| 3 | 0.75 | 17.0 |
| 4 | 0.75 | 16.2 |
| 5 | 1.0 | 17.1 |
| 6 | 1.0 | 17.6 |

The above examples clearly show that when a hydrophobic alcohol, in this instance decyl alcohol, is combined with a nonionic surfactant, lower moisture contents are obtained with iron ore concentrate than had a dewatering aid not been employed, or had various other dewatering agents been employed, such as those shown in the Comparative Examples.

In an effort to determine the range of hydrophobic alcohols which can be satisfactorily employed in the dewatering aid of the instant invention, the following examples were conducted. In each example a different hydrophobic alcohol is employed.

COMPARATIVE EXAMPLE E

The Experimental Procedure set forth above is followed in every material detail except that a dewatering aid was not employed. In the two runs made the resulting percent moisture content was 18.2% and 18.5%, respectively.

EXAMPLE 6

The Experimental Procedure set forth above is followed in every material detail. The dewatering aid therein employed comprises: 27.4% decyl alcohol, 11.1% polyethylene glycol ether of linear glycol with a hydrophilic-lipophilic balance of 12.1, 10% 2B alcohol (ethanol with 0.5% benzene added), 30% methyl cellosolve 16.5% water, 5% disodium ethoxylated alcohol half ester of sulfosuccinic acid. Test results are given in Table X.

EXAMPLE 7

The Procedure of Example 6 is followed in every material detail except that in place of decyl alcohol there is substituted 2-ethylhexanol. Test results are given in Table X.

EXAMPLE 8

The Procedure of Example 6 is followed in every material detail except that in place of decyl alcohol there is substituted a mixture of linear $C_8$ to $C_{10}$ alcohols. Test results are given in Table X.

EXAMPLE 9

The Procedure of Example 6 is followed in every material detail except that in place of decyl alcohol there is substituted n-decyl alcohol. Test results are given in Table X.

EXAMPLE 10

The Procedure of Example 6 is followed in every material detail except that in place of decyl alcohol there is substituted a mixture of linear $C_{10}$ to $C_{12}$ alcohols. Test results are given in Table X.

EXAMPLE 11

The Procedure of Example 6 is followed in every material detail except that in place of decyl alcohol there is substituted a mixture of linear secondary $C_{11}$–$C_{15}$ alcohols. Test results are given in Table X.

EXAMPLE 12

The Procedure of Example 6 is followed in every material detail except that in place of decyl alcohol there is substituted tridecyl alcohol. Test results are given in Table X.

TABLE X

COMPARISON DEWATERING RUNS EMPLOYING VARIOUS HYDROPHOBIC ALCOHOLS

| Example | Dosage (Lb/Ton Solids) | Percent Moisture |
|---|---|---|
| 6 | 0.5 | 16.3 |
| 6 | 0.5 | 16.5 |
| 7 | 0.5 | 18.1 |
| 8 | 0.5 | 17.3 |
| 9 | 0.5 | 17.0 |
| 10 | 0.5 | 17.6 |
| 11 | 0.5 | 18.1 |
| 12 | 0.5 | 17.6 |
| 6 | 0.75 | 13.8 |
| 6 | 0.75 | 13.8 |
| 7 | 0.75 | 17.2 |
| 8 | 0.75 | 15.1 |
| 9 | 0.75 | 14.9 |
| 10 | 0.75 | 14.3 |
| 11 | 0.75 | 17.6 |
| 12 | 0.75 | 17.4 |
| 6 | 1.0 | 13.8 |
| 6 | 1.0 | 14.7 |
| 7 | 1.0 | 16.9 |
| 8 | 1.0 | 13.7 |
| 9 | 1.0 | 12.8 |
| 10 | 1.0 | 13.1 |
| 11 | 1.0 | 15.5 |
| 12 | 1.0 | 16.1 |

The results obtained from the tests run on Examples 6 through 12 clearly show the preferred hydrophobic alcohols to be hydrophobic alcohols having eight to twelve carbon atoms in the aliphatic radical.

In an effort to determine the ratio range of hydrophobic alcohol to nonionic surfactant to be employed in the dewatering aid of the present invention, the following example was conducted.

EXAMPLE 13

The Experimental Procedure set forth above was followed in every material detail. The dewatering aid employed comprises of a 0.3 pound per ton dosage of the mixture of decyl alcohol and polyethylene glycol ether of linear glycol with a hydrophilic-lipophilic balance of 12.1. Test details and results are given in Table XI.

TABLE XI

SYNERGISTIC DEWATERING RUN

| Weight Percent Of Nonionic Surfactant* | Weight Percent Of Hydrophobic Alcohol** | Percent Moisture | Percent Moisture Reduction Over Control |
|---|---|---|---|
| 0 | 0 | 18.7 | — |
| 100 | 0 | 16.3 | 12.8 |
| 90 | 10 | 16.0 | 14.4 |
| 80 | 20 | 15.1 | 19.3 |
| 70 | 30 | 15.8 | 15.5 |
| 60 | 40 | 15.0 | 19.8 |
| 50 | 50 | 14.5 | 22.5 |
| 40 | 60 | 14.2 | 24.1 |
| 30 | 70 | 14.5 | 22.5 |
| 20 | 80 | 14.0 | 25.1 |
| 10 | 90 | 14.3 | 23.5 |
| 0 | 100 | 16.5 | 11.8 |

*polyethylene glycol ether of linear glycol
**decyl alcohol

EXAMPLE 14

When the Experimental Procedure set forth above is followed for concentrating coal and the dewatering aid comprises decyl alcohol and a nonionic surfactant of the formula:

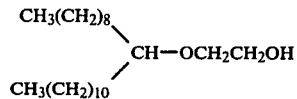

substantially equivalent results are obtained.

EXAMPLE 15

When the Experimental Procedure set forth above is followed for concentrating coal and the dewatering aid comprises a nonyl alcohol and a nonionic surfactant of the formula:

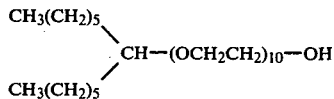

substantially equivalent results are obtained.

COMPARATIVE EXAMPLE F

The Experimental Procedure set forth above is followed in every material detail except that the example was carried out on copper concentrates with the filtration pressure set at 20 psi. for a period of 60 seconds. In this example, no dewatering aid was employed. Test results are given in Table XII.

EXAMPLE 16

The procedure of Comparative Example F is followed in every material detail except that a mixture comprising of 27.4% tridecyl alcohol, 11.1% polyethylene glycol ether of linear glycol having a hydrophilic-lipophilic balance of 12.1, 5% disodium ethoxylated alcohol half ester of sulfosuccinic acid, 10% ethanol, 30% methyl cellosolve and 16.5% water is added as the dewatering aid. Test results are given in Table XII.

EXAMPLE 17

The procedure of Example 16 is followed in every material detail except that in place of tridecyl alcohol in the dewatering aid there is employed 2-ethyl hexanol. Test results are given in Table XII.

EXAMPLE 18

The procedure of Example 16 is followed in every material detail except that in place of tridecyl alcohol in the dewatering aid there is now employed a mixture of primary linear alcohols containing eight to ten carbon atoms. Test results are given in Table XII.

EXAMPLE 19

The procedure of Example 16 is followed in every material detail except that in place of tridecyl alcohol in the dewatering aid there is now employed 1-decyl alcohol. Test results are given in Table XII.

EXAMPLE 20

The procedure of Example 16 is followed in every material detail except that in place of tridecyl alcohol in the dewatering aid there is now employed a mixture of primary linear alcohols containing ten to twelve carbon atoms. Test results are given in Table XII.

EXAMPLE 21

The procedure of Example 16 is followed in every material detail except that in place of tridecyl alcohol in the dewatering aid there is now employed a mixture of secondary linear alcohols containing ten to fifteen carbon atoms. Test results are given in Table XII.

EXAMPLE 22

The procedure of Example 16 is followed in every material detail except that in place of tridecyl alcohol in the dewatering aid there is now employed a mixture of primary linear alcohols containing twelve to fifteen carbon atoms. Test results are given in Table XII.

EXAMPLE 23

The procedure of Example 16 is followed in every material detail except that in place of tridecyl alcohol in the dewatering aid there is now substituted a mixture of primary linear alcohols containing sixteen to eighteen carbon atoms. Test results are given in Table XII.

EXAMPLE 24

The procedure of Example 16 is followed in every material detail except that in place of tridecyl alcohol in the dewatering aid there is now employed decyl alcohol. Test results are given in Table XII.

TABLE XII

| DEWATERING RUNS ON COPPER ORE | | |
|---|---|---|
| Example | Dosage* (Lb/Ton Solids) | Percent Moisture |
| Comp F | — | 16.1 |
| 16 | 0.5 | 14.1 |
| 17 | 0.5 | 15.1 |
| 17 | 0.5 | 15.1 |
| 18 | 0.5 | 14.0 |
| 19 | 0.5 | 13.2 |
| 20 | 0.5 | 12.4 |
| 20 | 0.5 | 13.8 |
| 21 | 0.5 | 14.1 |
| 22 | 0.5 | 15.9 |
| 23 | 0.5 | 15.3 |
| 24 | 0.5 | 14.0 |
| 24 | 0.5 | 14.1 |
| Comp F | — | 15.5 |
| 16 | 1.0 | 12.6 |
| 17 | 1.0 | 14.2 |
| 17 | 1.0 | 15.3 |
| 18 | 1.0 | 11.9 |
| 19 | 1.0 | 12.5 |
| 20 | 1.0 | 12.3 |
| 20 | 1.0 | 13.1 |
| 21 | 1.0 | 14.2 |
| 22 | 1.0 | 14.0 |
| 23 | 1.0 | 15.0 |
| 24 | 1.0 | 13.5 |
| 24 | 1.0 | 13.0 |

*dosage of dewatering aid employed

EXAMPLE 25

When the procedure of Example 16 is followed and the dewatering aid comprises a dodecyl alcohol and a nonionic surfactant of the formula:

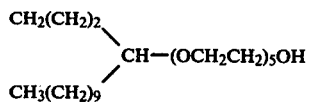

substantially equivalent results are obtained.

EXAMPLE 26

When the procedure of Example 16 is followed and the dewatering aid employed comprises a decyl alcohol and a nonionic surfactant of the formula:

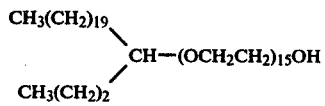

substantially equivalent results are obtained.

EXAMPLE 27

When the procedure of Example 16 is followed and the dewatering aid employed comprises a decyl alcohol and a nonionic surfactant of the formula:

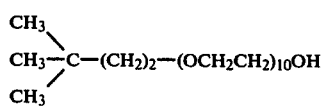

substantially equivalent results are obtained.

COMPARATIVE EXAMPLE 6

To verify that the solvents utilized in addition to the dewatering mixture of the present invention have no significant effect upon the dewatering process, a final comparative test is undertaken. In this Example the Experimental Procedure is again followed in every material detail except that the dewatering aid is not now employed. In place of the dewatering aid the solvents previously utilized are employed at dosages equivalent to their total dosage had a dewatering aid been employed at a dosage of 1.0 pounds per ton. A final run at approximately twice the above dosage is also undertaken. Test results and details are given in Table XIII.

TABLE XIII
COMPARATIVE EXAMPLE G

| Run | Reagents | Dosage (Lb/Ton Solids) | Percent Moisture |
| --- | --- | --- | --- |
| 1 | NONE | 0.0 | 18.8 |
| 2 | $G_1$ | 0.4 | 19.0 |
| 3 | $G_2$ | 0.45 | 19.0 |
| 4 | $G_2$ | 1.0 | 18.5 |

$G_1$ - 3:1 methyl cellosolve/2B alcohol
$G_2$ - 6:2:1 methyl cellosolve/2B alcohol/disodium ethoxylated alcohol half ester of sulfosuccinic acid.

We claim:

1. A dewatering aid for mineral and coal concentrates which comprises, in combination:
   (a) from about 1 to 99 weight percent of a monohydric hydrophobic alcohol, said hydrophobic alcohol containing a linear or branched unsubstituted aliphatic radical of eight to eighteen carbon atoms inclusive;
   (b) from about 99 to 1 weight percent of a nonionic surfactant, of the general structure:

$$R\text{-}(OCH_2CH_2)_xOH$$

wherein x is an integer of 1 to 15, inclusive, R is a branched or linear unsubstituted aliphatic radical containing six to twenty-four carbon atoms, inclusive, in the alkyl moiety.

2. The dewatering aid of claim 1 comprising from 50 to 90 weight percent of the hydrophobic alcohol and, correspondingly, 50 to 10 weight percent of the nonionic surfactant.

3. The dewatering aid of claim 1 wherein the hydrophobic alcohol has eight to twelve carbon atoms, inclusive, in the aliphatic radical.

4. The dewatering aid of claim 1 wherein the hydrophobic alcohol is a decyl alcohol containing 95 weight percent of trimethyl-1-heptanol and 5 weight percent of primary decyl alcohols.

5. The dewatering aid of claim 1 wherein the hydrophobic alcohol is n-decyl alcohol.

6. The dewatering aid of claim 1 wherein the nonionic surfactant is a polyethylene glycol ether of a linear glycol with a hydrophilic-lipophilic balance in the range of 10.0 to 15.0.

7. The dewatering aid of claim 1 wherein the nonionic surfactant is a linear primary alcohol ethoxylate containing twelve to thirteen carbon atoms in the alkyl moiety.

* * * * *